United States Patent [19]

Wiedermann et al.

[11] 3,941,726

[45] Mar. 2, 1976

[54] POLYGUANIDINE FOAMS

[75] Inventors: Rolf Wiedermann, Bergisch-Gladbach, Germany; Andrea La Spina, Garbagnate Milan, Italy

[73] Assignee: Bayer Aktiengesellschaft, Leverkusen, Germany

[22] Filed: Apr. 2, 1974

[21] Appl. No.: 457,291

[30] Foreign Application Priority Data

Apr. 11, 1973 Germany............................ 2318168

[52] U.S. Cl........ 260/2.5 N; 260/2.5 S; 260/2.5 BF; 260/77.5 R; 260/77.5 CR; 260/77.5 AP; 260/824 R; 260/830 P; 260/841; 260/849; 260/858

[51] Int. Cl.²...................... C08G 18/02; C08J 9/04

[58] Field of Search...................... 260/2.5 N, 2.5 BF

[56] References Cited

UNITED STATES PATENTS

| | | | |
|---|---|---|---|
| 2,941,966 | 6/1960 | Campbell | 260/2.5 N |
| 2,941,983 | 6/1960 | Smelty | 117/139.5 A |

*Primary Examiner*—Wilbert J. Briggs, Sr.
*Attorney, Agent, or Firm*—Joseph C. Gil; Gene Harsh

[57] ABSTRACT

A polyguanidine foam is prepared by reacting an amine or ammonia with a polycarbodiimide foam which has been prepared from a reaction mixture containing an addition product of an alcohol and a phospholine oxide or sulphide. The novel foam may be used for heat insulation or as an absorbent material.

5 Claims, No Drawings

POLYGUANIDINE FOAMS

This invention relates generally to cellular synthetic resins and more particularly to cellular synthetic resins which have a polyguanidine structure and to a method for making them.

Synthetic resins which contain potentially anionic groups are disclosed in Ullmann, Enzyklopadie d. Techn. Chemie, Volume 8, Munich 1957, page 787. The disadvantage of these synthetic resins is that such potentially anionic groups can only be introduced into the resin with difficulty and in small amounts and moreover the synthetic resins have a poor resistance to temperatures of about 100°C.

Polycarbodiimide resins including foam resins and processes for producing them have been disclosed in U.S. Pat. No. 2,941,966. The preparation of non-porous polyguanidine polymers by the reaction of polycarbodiimide polymers with amines is described in the patent.

Polyguanidine foam resins, on the other hand, have not previously been disclosed. It is clear from the publication by Campbell and Smeltz in Journal of American Chemical Society, 1963, pages 2069, et seq. that there has been an obvious prejudice against the production of polyguanidine synthetic resins, e.g., polyguanidine foam resins, by reacting non-cellular polycarbodiimide synthetic resins with amines.

It is therefore an object of this invention to provide improved cellular synthetic resins containing potentially ionic groups. Another object of the invention is to provide a cellular synthetic resin containing polyguanidine structures. Still another object of the invention is to provide a process for making cellular synthetic resins or foams containing polyguanidine structures.

The foregoing objects and others are accomplished in accordance with this invention, generally speaking, by providing a process wherein a solid cellular polycarbodiimide resin is reacted with ammonia or a primary or secondary amine to produce a foam resin which contains polyguanidine structures. It has been found surprisingly that a polycarbodiimide foam resin can be reacted with ammonia or a primary or secondary monoamine, diamine or polyamine having more than two amino groups to produce a foam resin which contains polyguanidine structures. Not only does this reaction result in foams which have a high capacity for binding anions but it also provides a means of cross-linking polycarbodiimide foams.

The preferred embodiment of this invention is a cellular, preferably open-celled synthetic resin having a density of about 10 kg/m³ to about 100 kg/m³ which has a molecular chain which contains guanidine groups.

The foams provided by the invention may be easily produced by causing amines in the gaseous phase or in solution or in the liquid state to act on polycarbodiimide foams. The molar ratio of carbodiimide groups to amines may vary widely, preferably between 1:1 and 1:1000. If less than the molar equivalent of amine is used, the synthetic resin obtained still contains carbodiimide groups in addition to guanidine groups.

The process provided by the invention is therefore a process for producing polyguanidine foams which is characterized in that polycarbodiimide foams are reacted with liquid or gaseous ammonia or with a fluid containing a primary and/or a secondary monoamine, diamine and/or a polyamine having more than two primary or secondary amino groups, preferably in a molar ratio of amine to carbodiimide of between 1:1 and 1000:1. Any suitable polycarbodiimide foam can be used in the process of the invention.

The polycarbodiimide foams used as a starting material according to the invention are known per se and may be prepared, for example, by the methods disclosed in U.S. Pat. Nos. 2,941,966 and 2,941,983, the disclosures of which are incorporated herein by reference. In the process according to the invention, on the other hand, the polycarbodiimide foams preferable used as starting material are those described in U.S. Pat. application Ser. No. 394,427 filed Sept. 4, 1973, the disclosure of which is incorporated herein by reference. The polycarbodiimide foams prepared in accordance with the process disclosed in the patent application are prepared in the presence of the addition compounds of the following components:

a. phospholine oxides, phospholine sulphides, phospholane oxides and phospholane sulphides and, b. monohydric alcohols, dihydric alcohols or polyhydric alcohols having more than two hydroxyl groups and a molecular weight of about 32 to about 250 or protonic acids which in N/10 aqueous solutions have a pH of between 1 and 8 or metals salts or acid chlorides.

In accordance with the process of the aforesaid patent application, these addition compounds are generally used in such a concentration as to provide from about 0.1% to about 20% by weight, preferably about 0.5% to about 10% by weight of component (a), based on the quantity of isocyanate.

Any suitable phospholine oxide and -sulphide and the corresponding phospholane oxide and -sulphide may be used as component (a) of the addition compound such as, for example, 1-phenyl-1-oxo-phospholine, 1-ethyl-1-oxo-phospholine, 3-methyl-1-phenyl-1-oxo-phospholine, 1-methyl-1-oxo-phospholine, 1-butyl-1-oxo-phospholine, 1-methoxy-1-oxo-phospholine, 1-hydroxy-1-oxo-phospholine and the like and the corresponding phospholane oxides and -sulphides.

Any suitable compound may be used as component (b) of the addition compounds such as, for example, monomeric alcohols, glycols and other polyhydric alcohols, organic acids which have a pH of between 1 and 8 when prepared as N/10 aqueous solutions, and inorganic and organic salts. Any suitable monohydric or polyhydric alcohol may be used such as, for example, methanol, ethanol, butanol, isopropanol and the like. Also any suitable polyhydric alcohol may be used, such as, for example, ethylene glycol, diethylene glycol, triethylene glycol, propanediol, butanediol, glycerol, trimethylolpropane, hexanediol, hexanetriol, pentaerythritol, sorbitol, amino alcohols such as triethanol amine and the like.

Any suitable organic acid such as, for example, formic acid, acetic acid, propionic acid, butyric acid, monochloroacetic acid, dichloroacetic acid, trichloroacetic acid, oxalic acid, fumaric acid, maleic acid and the like may be used. Any suitable inorganic acid may be used such as, for example, hydrogen chloride, hydrogen bromide, hydrogen iodide, orthophosphoric acid, boric acid and the like. Any suitable organic and inorganic salt may be used such as, alkali metal salts, alkaline earth metal salts and salts of phosphoric acid, including sodium oxalate, potassium acetate, potassium formate, zinc chloride, magnesium chloride, calcium chloride, tin chloride, phosphorus trichloride, phosphorus oxitrichloride, phosphorus pentachloride, titanium(IV)chloride, aluminum trichloride, antimonium pentachloride and the like.

Addition compounds obtained from the following components are preferred:

a. 1-phenyl-1-oxo-phospholine, 1-ethyl-1-oxo-phospholine, 3-methyl-1-phenyl-1-oxo-phospholine, 1-methyl-1-oxo-phospholine, 1-butyl-1-oxo-phospholine, 1-methoxy-1-oxo-phospholine, 1-hydroxy-1-oxo-phospholine;

b. monohydric or polyhydric alcohols which have a molecular weight of about 32 to about 250 or monocarboxylic acids or polycarboxylic acids which have a molecular weight of about 46 to about 250 or metal salts or acid halides or inorganic acids.

Addition compounds from the following components are particularly preferred:

a. 1-methyl-1-oxo-phospholine;

b. glycerol, ethylene glycol, formic acid, oxalic acid, phosphorus trichloride, phosphorus oxichloride, HCl, zinc chloride, or aluminium trichloride, which represent the most suitable addition partners for 1-methyl-1-oxo-phospholine.

To prepare the addition compounds, component (a) and component (b) may be mixed in a molar ratio of between 1:20 and 20:1, preferably between 1:5 and 5:1 and more particularly between 1:2 and 3:1.

The catalysts disclosed in Canadian Pat. No. 885,490, the disclosure of which is incorporated herein by reference, may be used. According to the said patent, a mixture of 2,4,6-tris-(dialkanol-amino)-s-triazine and 1,3,5-tris-(N,N'-dialkylaminoalkyl)-s-hexahydrotriazine may be used in quantities of 0.1% to 10% based on the isocyanate.

The amines used for the process according to the invention may be any suitable known primary or secondary amine. Primary and/or secondary aliphatic and aromatic amines containing 1 to 5 primary and/or secondary amino groups are preferred. Hydrazine, ammonia or aqueous ammonia solutions may also be used. Ammonia and primary amines are preferred. The following are examples of suitable aliphatic amines: methylamine ethylamine, propylamine, butylamine, dimethylamine, diethylamine, dipropylamine, and dibutylamine; 1,2-diaminoethane, N,N'-bis-(2-aminoethyl)-ethylenediamine, 1,11-diamino-3,6,9-triazaundecane, 1,14-diamino-3,3,9,12-tetraza-tetradecane, piperazine, 1,2-diaminopropane, 1,4-diamino-butane, 1,6-diaminohexane, N,N'-dimethyl-1,2-diaminoethane, 3-amino-1-methylaminopropane, 2-aminoethanol, methyl-(2)-aminoethanol, benzylamine, cyclohexylamine and 1,4-diaminocyclohexane.

Any suitable aromatic amine may be used such as, for example, aniline, 2-chloroaniline, 2,4-dichloroaniline, m-toluidine, p-toluidine, p-phenylenediamine, 2,4-aminotoluene, 2,6-aminotoluene, 4,4'-diaminodiphenylmethane, crude condensation products of aniline and formaldehyde, isopropyl ester of anthranilic acid, triethylene glycol ester of dianthranilic acid, N-methyl aniline and the like.

Any suitable organic polyisocyanate may be used for producing polycarbodiimide foams including aliphatic, cycloaliphatic, araliphatic, aromatic or heterocyclic polyisocyanates such as those described, e.g., by W. Siefken in Justus Liebigs Annalen der Chemie, 562, pages 75 to 136, the disclosure of which is incorporated herein by reference, for example, ethylene diisocyanate, tetramethylene-1,4-diisocyanate, hexamethylene-1,6-diisocyanate, dodecane-1,12-diisocyanate, cyclobutane-1,3-diisocyanate, cyclohexane-1,3-diisocyanate, cyclohexane-1,4-diisocyanate and any mixtures of these isomers, 1-isocyanato-3,3,5-trimethyl-5-isocyanato-methyl-cyclohexane (DAS No. 1,202,785), hexahydrotolylene-2,4-diisocyanate, hexahydrotolylene-2,6-diisocyanate and any mixtures of these isomers, hexahydro-1,3-diisocyanate, hexahydro-1,4-phenyl-diisocyanate, perhydro-2,4'-diphenylmethane diisocyanate, perhydro-4,4'-diphenylmethane diisocyanate, phenylene-1,3-diisocyanate, phenylene-1,4-diisocyanate, tolylene-2,4-diisocyanate, tolylene-2,6-diisocyanate and any mixtures of these isomers, diphenylmethane-2,4'-diisocyanate, diphenylmethane-4,4'-diisocyanate, naphthylene-1,5-diisocyanate, triphenylmethane-4,4',4''-triisocyanate, polyphenyl-polymethylene polyisocyanates such as those which can be obtained by aniline-formaldehyde condensation followed by phosgenation and which have been described, e.g., in British patent specification Nos. 874,430 and 848,671, perchlorinated aryl polyisocyanates as described, e.g., in German Auslegeschrift No. 1,157,601, polyisocyanates containing carbodiimide groups as described in German Pat. No. 1,092,007, the diisocyanates described in U.S. Pat. No. 3,492,330, polyisocyanates containing allophanate groups as described, e.g., in British patent specification No. 994,890, Belgian Pat. No. 761,626 and published Dutch patent application No. 7,102,524, polyisocyanates containing isocyanurate groups as described, e.g., in German Pat. Nos. 1,022,789, 1,222,067 and 1,027,394 and in German Offenlegungsschrift Nos. 1,929,034 and 2,004,048, polyisocyanates containing urethane groups as described, e.g., in Belgian Pat. No. 752,261 or in U.S. Pat. No. 3,394,164, polyisocyanates containing acylated urea groups as described in German Pat. No. 1,230,778, polyisocyanates containing biuret groups as described, e.g., in German Pat. No. 1,101,304, in British patent specification No. 889,050 and in French Pat. No. 7,017,514, polyisocyanates prepared by telomerization reactions as described, e.g., in Belgian Pat. No. 723,640, polyisocyanates containing ester groups such as those mentioned, e.g., in British patent specification Nos. 965,474 and 1,072,956, in U.S. Pat. No. 3,567,763 and in German Pat. No. 1,231,688 and reaction products of the above mentioned isocyanates with acetals in accordance with German Pat. No. 1,072,385.

The distillation residues from the commercial production of isocyanates, which residues still contain isocyanate groups may also be used, if desired in the form of solutions in one or more of the above mentioned polyisocyanates. Any mixtures of the above mentioned polyisocyanates may also be used.

It is generally preferred to use the commercially readily available polyisocyanates such as tolylene-2,4-diisocyanate and tolylene-2,6-diisocyanate and any mixtures of these isomers ("TDI"), polyphenyl-polymethylene-polyisocyanates which can be obtained by aniline-formaldehyde condensation followed by phosgenation ("crude MDI") and polyisocyanates which contain carbodiimide groups, urethane groups, allophanate groups, isocyanurate groups, urea groups or biuret groups ("modified polyisocyanates").

Optionally any organic compound which contains at least two hydrogen atoms determinable by the Zerewitinoff method and capable of reacting with isocyanates and having a molecular weight in the range of about 62 to about 10,000 may be included in the reaction mixture as starting components for the production of the polycarbodiimide foams. These compounds may be compounds which contain amino groups, thiol groups or carboxyl groups but are preferably polyhydroxyl compounds, preferably those which contain 2 to 8 hydroxyl groups and especially those with a molecular weight of about 400 to about 10,000 preferably about 1,000 to about 6,000 for example, hydroxyl polyesters, polyethers, polythioethers, polyacetals, polycarbonates containing at least 2, generally 2 to 8 but preferably 2 to 4 hydroxyl groups, and polyester amides of the kind which are known per se for the production of homogeneous and cellular polyurethanes.

The hydroxyl-containing polyesters used for the process are, e.g., reaction products of polyhydric, preferably dihydric alcohols with the optional addition of trihydric alcohols, with polybasic, preferably dibasic carboxylic acids. Instead of the free polycarboxylic acids, the corresponding polycarboxylic acid anhydrides or corresponding polycarboxylic acid esters of lower alcohols or mixtures thereof may be used for the preparation of the polyesters. The polycarboxylic acids may be aliphatic, cycloaliphatic, aromatic and/or heterocyclic and may be substituted, e.g., with halogen atoms, and/or unsaturated. The following are examples thereof: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid and dimeric and trimeric fatty acids, such as oleic acid, optionally mixed with monomeric fatty acids, dimethyl terephthalate, bis-glycol-terephthalate and the like. The following are examples of suitable polyhydric alcohols: ethylene glycol, propylene-1,2-glycol, propylene-1,3-glycol, butylene-1,4-glycol, butylene-2,3-glycol, hexane-1,6-diol, octane-1,8-diol, neopentyl glycol, cyclohexane dimethanol (1,4-bis-hydroxy-methyl cyclohexane), 2-methyl-propane-1,3-diol, glycerol, trimethylolpropane hexane-1,2,6-triol, butane-1,2,4-triol, trimethylolethane, pentaerythritol, quinitol, mannitol and sorbitol, methyl glycoside, diethylene glycol, triethylene glycol, tetraethylene glycol, polyethylene glycol, dipropylene glycol, polypropylene glycols, dibutylene glycol, polybutylene glycols and the like. The polyesters may contain a proportion of terminal carboxyl groups. Polyesters of lactones such as $\epsilon$-caprolactone and hydroxy carboxylic acids such as $\omega$-hydroxy caproic acids may also be used.

Any hydroxyl polyether may be used according to the invention which contains at least two and generally two to eight, but preferably two or three hydroxyl groups. Such polyethers are known per se. The polyethers may be prepared by polymerization of epoxides, such as ethylene oxide, propylene oxide, butylene oxide, tetrahydrofuran, styrene oxide or epichlorohydrin, each with itself, e.g., in the presence of $BF_3$, or by addition of these epoxides, optionally as mixtures or successively, to starting components which contain reactive hydrogen atoms such as alcohols or amines, e.g., water, ethylene glycol, propylene-1,3-glycol, propylene-1,2-glycol, trimethylolpropane, 4,4'-dihydroxy-diphenylpropane, aniline, ammonia, ethanolamine or ethylene diamine.

Sucrose polyethers such as those described, e.g., in U.S. Pat. No. 3,153,002 and in German Auslegeschrift No. 1,064,938 may also be used in the process according to the invention. It is frequently preferred to use those polyethers which contain predominantly primary OH-groups (up to 90% by weight, based on all the OH-groups present in the polyether). Polyethers which have been modified by vinyl polymerization, e.g., by polymerization of styrene or acrylonitrile in the presence of polyethers (U.S. Pat. Nos. 3,383,351; 3,304,273; 3,523,093 and 3,110,695 and German Pat. No. 1,152,536) and polybutadienes which contain OH groups are also suitable.

Any suitable polythioether may be used such as, for example, the condensation products of thiodiglycol with itself and/or with other glycols, dicarboxylic acids, formaldehyde, aminocarboxylic acids or amino alcohols. The products obtained are either polythio mixed ethers, polythioether esters or polythioether ester amides, depending upon the component used in making them.

Any suitable polyacetal may be used, e.g., the compounds which can be prepared from glycols such as diethylene glycol, triethylene glycol, 4,4'-dihydroxyethoxy-diphenyldimethylmethane or hexanediol and formaldehyde. Polyacetals suitable for the process of the invention may also be obtained by polymerizing cyclic acetals.

Any suitable polycarbonate which contains hydroxyl groups may be used, including those obtained by reacting diols such as propane-1,3-diol, butane-1,4-diol and/or hexane-1,6-diol, diethylene glycol, triethylene glycol or tetraethylene glycol with diaryl carbonates such as diphenyl carbonate or phosgene.

Any suitable polyester amide or polyamide may be used such as, for example, the predominantly linear condensate obtained from polyvalent saturated and unsaturated carboxylic acids or their anhydrides and polyvalent saturated and unsaturated amino alcohols, diamines, polyamides and mixtures thereof.

Polyhydroxyl compounds which already contain urethane or urea groups and modified or unmodified natural polyols such as castor oil, carbohydrates or starch may also be used. Addition products of alkylene oxides with phenol formaldehyde resins or with urea-formaldehyde resins may also be used according to the invention.

Representatives of these organic compounds having reactive hydrogens may be used according to the invention have been described e.g., in High Polymers, Volume XVI "Polyurethanes, Chemistry and Technology" by Saunders and Frisch, Interscience Publishers, New York, London, Vol. I, 1962, pages 32–42 and pages 44–54 and Vol. II, 1964, pages 5–6 and 198–199 and in Kunststoff-Handbuch, Volume VII, Vieweg-Hochtlen, Carl-Hanser Verlag, Munich 1966, e.g., on pages 45 to 71, the disclosures of which are incorporated herein by reference.

Water and/or readily volatile organic substances may be used as blowing agents for producing the carbodiimide foams. Suitable organic blowing agents are e.g., acetone, ethylacetate, halogenated alkanes such as methylene chloride, chloroform, ethylidene chloride, vinylidene chloride, monofluorotrichloromethane, chlorodifluoromethane, and dichlorodifluoromethane, as well as butane, hexane, heptane, diethyl ether or the like. A blowing action can also be obtained by adding compounds which decompose at temperatures above room temperature to liberate gases such as nitrogen, e.g., azo compounds such as azoisobutyric acid nitrile. Other examples of blowing agents and details of the methods of using blowing agents may be found in Kunststoff-Handbuch, Volume VII, published by Vieweg and Hochtlen, Carl-Hanser-Verlag, Munich 1966, e.g., on pages 108 and 109, 453 to 455 and 507 to 510. However, the polycarbodiimide foams used in the invention can be made without blowing agent.

Any catalytic amount of any suitable catalyst known to be effective in polyurethane chemistry may also be used in making the polycarbodiimide foam. The following are examples of known catalysts which are suitable: tertiary amines such as triethylamine, tributylamine, N-methyl-morpholine, N-ethyl-morpholine, N-cocomorpholine, N,N,N',N'-tetramethylethylenediamine, 1,4-diaza-bicyclo-(2,2,2)-octane, N-methyl-N'-dimethyl-aminoethyl-piperazine, N,N-dimethylbenzylamine, bis-(N,N-diethylaminoethyl)-adipate, N,N-diethylbenzylamine, pentamethyl diethylenetriamine, N,N-dimethyl-cyclohexylamine, N,N,N',N'-tetramethyl-1,3-butanediamine, N,N-dimethyl-β-phenyl ethylamine, 1,2-dimethyl imidazole, 2-methyl imidazole and the like.

The following are examples of suitable tertiary amine catalysts which contain hydrogen atoms that are reactive with isocyanate groups: triethanolamine, triisopropanolamine, N-methyldiethanolamine, N-ethyldiethanolamine, N,N-dimethylethanolamine and their reaction products with alkylene oxides such as propylene oxide and/or ethylene oxide.

Silaamines with carbon-silicon bonds as described, e.g., in German Pat. No. 1,229,290 may also be used as catalysts, e.g., 2,2,4-trimethyl-2-silamorpholine or 1,3-diethylaminomethyl-tetramethyl-disiloxane.

In certain cases, e.g., when foaming undistilled phosgenation mixtures of tolylene diamine, it may be advantageous to use catalysts which accelerate the reaction of NCO groups with themselves to form an isocyanurate in addition to polycarbodiimide-catalyst addition compounds.

The catalysts used for the formation of isocyanurate groups may be any catalyst of this kind, preferably one of those which brings about gelling of the isocyanate accompanied by isocyanurate formation at a temperature of 20°C within 10 minutes if they are added in a quantity of 1 g to 10 g per 100 g of organic polyisocyanate. Catalysts which fulfill these conditions are, for example, sodium phenoxide, sodium trichlorophenoxide, 2,4,6-tri-(dimethylaminomethyl)-phenol, a mixture of 80% of ortho- and 20% of para-dimethylaminomethyl phenol, potassium acetate, N,N',N''-tris-(dimethylaminopropyl)-s-hexahydrotriazine and the like.

Bases which contain nitrogen, such as tetraalkyl ammonium hydroxides, or alkali metal hydroxides such as sodium hydroxide or alkali metal alcoholates such as sodium methoxide may also be used as catalysts for isocyanurate formation.

Organic metal compounds may also be used as catalysts, particularly organic tin compounds.

The organic tin compounds used are preferably tin-(II) (stannous) salts of carboxylic acids such as tin(II)-acetate, tin(II)-octoate, tin(II)-ethyl hexoate and tin-(II)-laurate and the dialkyl tin salts of carboxylic acids such as dibutyl tin diacetate, dibutyl tin dilaurate, dibutyl tin maleate or dioctyl tin diacetate.

Other representatives of catalysts which may be included for the production of polycarbodiimide foams and details of the mode of action of the catalysts are described in Kunststoff-Handbuch, Volume VII, published by Vieweg and Hochtlen, Carl-Hanser-Verlag, Munich 1966, e.g., on pages 96 to 102, the disclosure of which is incorporated herein by reference.

Any catalytic amount of catalyst may be used in making polycarbodiimide foams. Preferably, the catalyst is used in an amount which is between about 0.001% and 10% by weight, based on the weight of polyisocyanates.

Any suitable surface-active additive (emulsifier or foam stabilizer) may also be used in the production of polycarbodiimide foams. The emulsifier may be, e.g., the sodium salts of ricinoleic sulphonates or of fatty acids or salts of fatty acids with amines such as oleic acid diethylamine or stearic acid diethanolamine. Alkali metal or ammonium salts of sulphonic acids such as dodecyl benzene sulphonic acid or dinaphthyl methane disulphonic acid or of fatty acids such as ricinoleic acid or of polymeric fatty acids may also be included as surface-active additives.

The foam stabilizers used are mainly water-soluble polyether siloxanes. These compounds are generally constructed so that a copolymer of ethylene oxide and propylene oxide is connected to a polydimethyl siloxane radical. Foam stabilizers of this type have been described, e.g., in U.S. Pat. No. 3,629,308.

Reaction retarders may also be used, e.g., substances which are acid in reaction such as hydrochloric acid or organic acid halides, or cell-regulators known per se such as paraffins or fatty alcohols or dimethyl polysiloxanes, as well as pigments or dyes and flame-retarding agents known per se, e.g., tris-chloroethyl phosphate or ammonium phosphate and polyphosphate, age resistors and stabilizers to prevent weathering, plasticizers and fungistatic and bacteriostatic substances as well as fillers such as barium sulphate, kieselguhr carbon black or whiting.

The fillers may be introduced into the reaction mixture which will give rise to the foam. Suitable fillers also include barium sulphate, graphite, chalk, asbestos, silica calcium silicate, aluminum oxide and fibrous materials such as nylon, polyacrylonitrile, polyethylene terephthalate and glass fibers.

Other examples of surface-active additives, foam stabilizers, cell-regulators, reaction retarders, stabilizers, flame-retarding substances, plasticizers, dyes, fillers and fungistatic and bacteriostatic substances which may also be included as well as details of their methods of use and mode of action may be found in Kunststoff-Handbuch, Volume VI, published by Vieweg-Hochtlen, Carl-Hanser-Verlag, Munich 1966, e.g., on pages 103 to 113.

According to the invention, the reactants are reacted together in making the polycarbodiimide foam by the one-step process, prepolymer process or semi-prepolymer process known per se, in may cases using mechanical devices such as those described in U.S. Pat. No. 2,764,565. Details of equipment which may be used for applying or working up the products in accordance with the invention may be found in Kunststoff-Handbuch, Volume VI, published by Vieweg and Hochtlen, Carl-Hanser-Verlag, Munich 1966, e.g., on pages 121 to 205.

It has been found that the polyguanidine foams according to the invention are eminently suitable for use as absorbents for substances which are acid in reaction as well as heat and/or sound insulating materials. This invention therefore also relates to the use of polyguanidine foams according to the invention as absorbents for substances which are acid in reaction and as heat and/or sound insulating material.

The polyguanidine foams according to the invention may be used for removing acidic constituents from gases or liquids; for example, when a polyguanidine foam which has been prepared by an addition reaction of ammonia with a polycarbodiimide foam is stored in hydrochloric acid, a polyguanidine-hydrocarbide foam is produced. The polyguanidine foams according to the invention may also advantageously be used as heat and/or sound insulating materials.

EXAMPLES

Carbodiimide foams are first produced.

Example A 100 g of a polyphenyl polymethylene polyisocyanate prepared by phosgenating the reaction product of aniline with formaldehyde, said polyphenyl polymethylene polyisocyanate having the following formula:

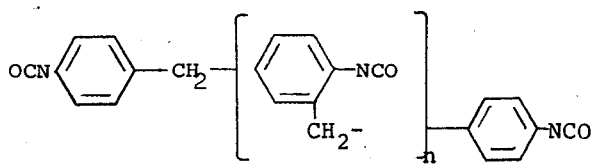

wherein $n$ has an average value of about 1.1 and contains about 45 percent diisocyanate, about 20 percent triisocyanate, the balance being tetra- and pentaisocyanates sufficient to give $n$ a value of about 1.1, said polyphenyl polymethylene polyisocyanate having an —NCO content of 31.7% by weight, is vigorously mixed in a beaker with 5 g of glycerol, 2.5 g of 1-methyl-1-oxophospholine and 0.5 g of a silicone stabilizer L 5310 for 15 seconds. The mixture foams up in the beaker and hardens after 2 minutes. The foam has a density of 18 kg/m³. 300 g of the foam product contains 1 mol of carbodiimide.

L 5310 used in these Examples has the formula:

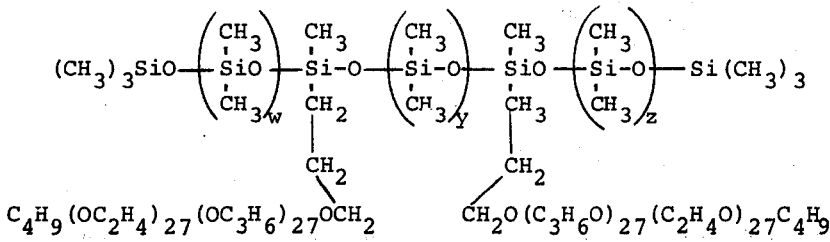

where the sum of $w$, $y$ and $z$ is about 16.

Example B

Example A is repeated but the formulation is foamed in a closed mold and compressed. The resulting foam has a density of 46 kg/m³.

Example C 100 g of a mixture of distilled 80% 2,4- and 20% 2,6-tolylene diisocyanate and a distillation residue obtained from the distillation of tolylene diisocyanate, which residue has an isocyanate content of 38%, are vigorously mixed with 0.5 g of 1-methyl-1-oxo-phospholine, 7.5 g of tris-(dimethylaminopropyl)-s-hexahydrotriazine and 5 g of trichloroethyl phosphate in a beaker for 15 seconds. A foam which contains isocyanurate and carbodiimide groups and has a density of 29 kg/m³ is obtained. According to IR spectroscopic investigation, the foam predominantly contains carbodiimide groups in addition to isocyanurate groups.

Example 1

1 g of the foam described in Example A and 10 g of N,N'-dimethyl-ethylenediamine are boiled under reflux for 3 hours. According to IR spectroscopic investigation, approximately 50% of the carbodiimide groups have undergone reaction (molar ratio carbodiimide/amine approximately 1:70.)

Example 2

10 g of the foam described in Example A and 20 g of n-butylamine are boiled under reflux for 2 hours. According to IR spectroscopic investigation, complete conversion has taken place (molar ratio carbodiimide/amine approximately 1:8).

The polyguanidine foam obtained has a density of 19 kg/m³ and a compression strength of 0.5 kg.wt/cm².

Example 3

1 g of the foam described in Example A is boiled under reflux in 10 g of benzene and 2 g of ethylenediamine for 3 hours. According to IR spectroscopic investigation, complete conversion has taken place (molar ratio carbodiimide/amine approximately 1:20).

Example 4

100 g of the foam described in Example A are boiled in 1000 g of 25% aqueous ammonia solution for 5 hours. IR spectroscopic investigation indicates complete conversion to the guanidine. The foam has a density of 19 kg/m³, a coefficient of thermal conductivity of 0.03 kcal/m.h degree 95% open cells and a compression strength of 0.6 kg/m³. Part of the foam is stirred in 10% aqueous hydrochloric acid for 12 hours. The foam is filtered, washed with water and dried. The chlorine content found by elementary analysis is 8.3%. From this value, the capacity is calculated to be 2.5 mval of acid/g of polyguanidine foam. This foam undergoes volumetric shrinkage by less than 1% when stored for 5 hours at 120°C.

Example 5

10 g of the foam prepared in accordance with Example B, 100 g of benzene and 10 g of aniline are boiled for 3 hours. According to IR spectroscopic investigation, approximately 40% of all the carbodiimide groups have been converted to guanidine groups (molar ratio carbodiimide/amine 1:3). The resulting foam has a density of 50 kg/m$^3$.

Example 6

4 g of the foam described in Example C are boiled under reflux with a solution of 2 g of n-butylamine in 8 g of benzene for 3 hours and then dried. According to IR spectroscopic investigation, approximately 20% of the carbodiimide has been converted to guanidine.

Example 7

4 g of the foam described in Example C are boiled with a solution of 50 g of 25% aqueous ammonia solution for 3 hours and then dried. According to IR spectroscopic investigation, all the carbodiimide groups have been converted into guanidine groups. The resulting foam has a density of 30 kg/m$^3$.

Any of the other components disclosed as suitable herein may be substituted for those in the foregoing examples.

Although the invention has been described in detail in the foregoing, for the purpose of illustration, it is to be understood that such detail is solely for that purpose and that variations can be made therein by those skilled in the art without departing from the spirit and scope of the invention except as it may be limited by the claims.

What is claimed is:

1. A process for producing a polyguanidine foam which comprises reacting a solid polycarbodiimide foam with a fluid containing a primary or secondary amine or ammonia.

2. The process of claim 1 wherein the polycarbodiimide foam was prepared with an aromatic polyisocyanate.

3. The process of claim 1 wherein the amine is a primary or secondary amine containing from 1 to 5 amino groups.

4. The process according to claim 1 wherein a primary amine is reacted with the polycarbodiimide foam.

5. A method of making polyguanidine foam which comprises contacting a carbodiimide foam with a fluid containing hydrazine, ammonia or a primary or secondary amine, said polycarbodiimide foam having been prepared from a reaction mixture containing an organic polyisocyanate, addition product of phospholine oxide or sulfide and an alcohol or a protonic acid which in a N/10 aqueous solution has a pH of 1 to 8, a metal salt or an acid chloride and optionally a blowing agent.

* * * * *